No. 626,944. Patented June 13, 1899.
B. O. TILDEN.
PIPE FITTING.
(Application filed Jan. 26, 1899.)
(No Model.)
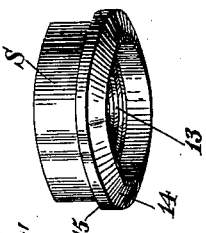
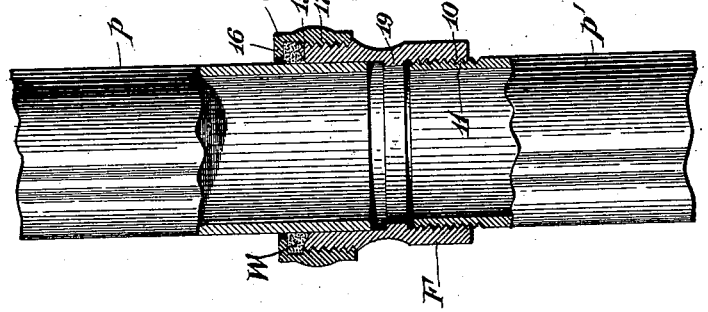
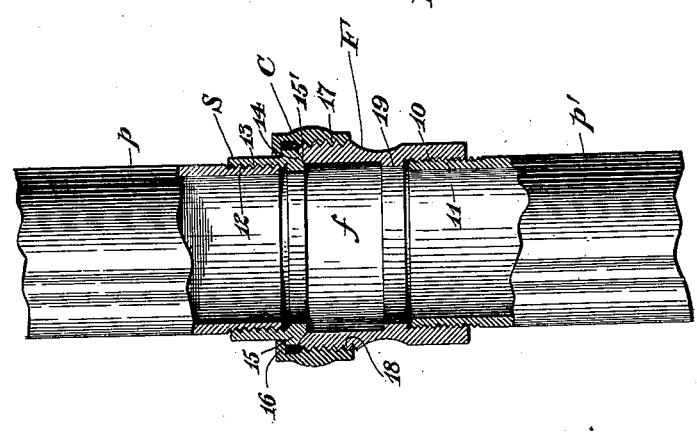
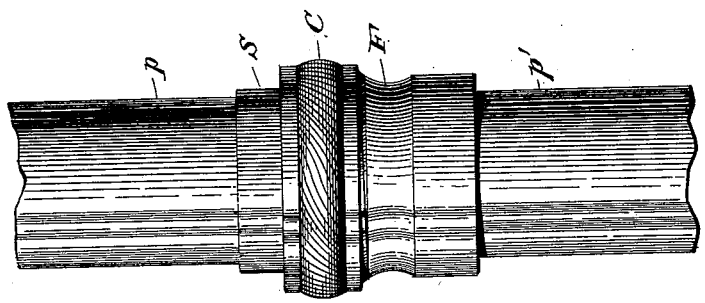
Witnesses:
Inventor:
B. O. Tilden,
By his Attorney

UNITED STATES PATENT OFFICE.

BERT O. TILDEN, OF DETROIT, MICHIGAN.

PIPE-FITTING.

SPECIFICATION forming part of Letters Patent No. 626,944, dated June 13, 1899.

Application filed January 26, 1899. Serial No. 703,459. (No model.)

*To all whom it may concern:*

Be it known that I, BERT O. TILDEN, a citizen of the United States, residing in Detroit, in the county of Wayne and State of Michigan, have invented certain new and useful Improvements in Pipe-Fittings, of which the following is a specification.

My invention relates to fittings such as are employed for the purpose of forming joints or connections between pipes whether said joints are in the nature of what are called "slip-joints" or are what are termed "union-joints;" and it has for its object to provide a fitting of the class mentioned whereby either pipe connection may be made without rendering it necessary to substitute one fitting for another whenever a change in the character of such connection is desired.

Heretofore it has been the practice in the art to which my invention relates to furnish a separate and distinct fitting for each individual class of joint, because a fitting adapted to be used for a union could not be employed for the purpose of effecting a slip-joint, and vice versa, so that the plumber or pipe-fitter was forced to keep on hand a certain amount of stock of both slip and union fittings, while when it was desired to discard the form of joint in use it was necessary to substitute an entire fitting of the new style required. It is the aim of my invention to avoid these objections to the old individual style of joints by producing a pipe-fitting which is adapted for either a slip-joint or a union, and in such a manner that either can be converted into the other by the mere substitution of a union-seat for a packing-ring; or vice versa, and without the employment of skilled labor.

The particular advantage of a fitting constructed in accordance with my invention may, perhaps, be pertinently illustrated in what is generally known as "branch fittings"—as, for instance, a T in which by using three seat-rings said fitting may have three union-joints or by the substitution of packing-rings for said seat-rings said T may be converted into a fitting having two unions and one slip-joint or one union and two slip-joints, or all the branches may constitute slip-joints. In this particular instance there are practically four distinct fittings of the ordinary type combined in one, so that the cost of the fitting, and, if needed, the three seat-rings, is far less than that of four separate fittings as heretofore used.

In the drawings accompanying and forming part of this specification, Figure 1 is a side view of two pipes joined by a fitting constructed in accordance with my present invention. Fig. 2 represents a central vertical section of the same, showing the manner in which said joint may be effected to form a union. Fig. 3 is a similar view illustrating the fitting adapted to constitute a slip-joint, and Fig. 4 is a perspective view of the seat-ring to be employed in connection with my improved fitting when forming a union.

Similar characters designate like parts in all the figures of the drawings, in which—

$p\ p'$ designate, respectively, two pipes joined at their approaching ends by means of the fitting F, which in the preferred form thereof is made in the shape of a hollow cylinder or barrel having an internal screw-thread 10 in engagement with an external corresponding screw-thread 11, formed at the end of the pipe $p'$. The pipe $p$ also is screw-threaded, as at 12, to receive the threaded portion 13 of what is ordinarily termed a "union-seat" S, having the beveled surface 14, corresponding with the similarly-beveled end 15' of the fitting F. The seat-ring S is also provided with a retaining flange or shoulder 15, to be engaged by the annular lip 16, formed on a clamping-collar C, having an internal screw-thread, as 17, adapted to engage a similar screw-thread 18 on the fitting F, whereby said clamping-collar may be moved along on said fitting to force the seat S into close contact with the beveled end of the same; but I do not of course limit myself to the use of this or any special form of connecting means for retaining the separate members of my improved fitting in their proper positions.

The smooth bore of the barrel F is of a diameter at $f$ to correspond with the outside diameter of the pipe used in connection therewith, and a reinforcing ring or flange 19 is provided therein and may serve, if desired, as a shoulder between which and the end of the pipe $p'$ a packing-ring (not shown) may be clamped to make a tight joint between said pipe and the fitting F.

The construction so far described embodies what is generally known as a "union-joint" to be employed in making a firm and tight connection between the adjacent ends of fixed pipes, and I will now describe the application of my improved fitting when adapted to the formation of what is generally known as a "slip-joint" and which is illustrated in Fig. 3 of the drawings.

In adapting a fitting made in accordance with my invention to the formation of a slip-joint it is only necessary to dispense with the union-seat S, above described, and to substitute therefor the packing ring or washer W, which may by the movement of the clamping-collar C be compressed into close contact with the outer surface of the pipe $p$, and thus prevent any leak without in any way interfering with the sliding or slipping movement on the part of said pipe within the fitting F. Hence it will be seen that my improved fitting may readily be used for either a union or a slip joint without rendering its removal from both pipes necessary.

In the drawings I have illustrated a straight-way fitting of improved construction; but it should be distinctly understood that the number of ducts leading into or out of the barrel of the fitting may be varied as desired.

Having described my invention, I claim—

1. The combination, with pipes, of a fitting having a smooth interior wall terminating in a seat at one end, said wall being adapted to receive the pipe when a "slip-joint" is desired; a complementary fitting, or "union-seat," for rigid attachment to a pipe; and a clamping-collar engaging the main fitting and adapted to hold in place thereon either said "union-seat" or a gasket.

2. A pipe-fitting comprising a short section of tubing internally threaded at one end and having a smooth wall terminating in a seat at the other end, said section also having an external thread; a complementary fitting, or "union-seat," for rigid attachment to a pipe; and a clamping-collar engaging the external thread and adapted to hold in place said "union-seat" or a gasket, substantially as and for the purpose specified.

BERT O. TILDEN.

Witnesses:
ALBERT E. HYDE,
CHARLTON E. PARTRIDGE.